(12) United States Patent
Chen et al.

(10) Patent No.: US 10,344,965 B2
(45) Date of Patent: Jul. 9, 2019

(54) INTEGRATED LIQUID INJECTION EVAPORATION CONTAINER

(71) Applicant: Smiss Technology Co., Ltd., Shenzhen, Guangdong (CN)

(72) Inventors: Jiatai Chen, Guangdong (CN); Wanxiang Zou, Guangdong (CN)

(73) Assignee: SMISS TECHNOLOGY CO., LTD., Shenzhen, Guangdong (CN)

( * ) Notice: Subject to any disclaimer, the term of this patent is extended or adjusted under 35 U.S.C. 154(b) by 176 days.

(21) Appl. No.: 15/388,837

(22) Filed: Dec. 22, 2016

(65) Prior Publication Data

US 2017/0276342 A1    Sep. 28, 2017

Related U.S. Application Data

(63) Continuation of application No. PCT/CN2016/087301, filed on Jun. 27, 2016.

(30) Foreign Application Priority Data

Mar. 22, 2016  (CN) ...................... 2016 2 0220785 U

(51) Int. Cl.
  *B01B 1/00*   (2006.01)
  *B01D 1/30*   (2006.01)
  (Continued)

(52) U.S. Cl.
  CPC ............ *F22B 1/284* (2013.01); *A24F 47/008* (2013.01); *B01B 1/005* (2013.01); *B01D 1/30* (2013.01); *B65D 41/16* (2013.01); *B65D 53/02* (2013.01)

(58) Field of Classification Search
  CPC ..... A24F 47/008; F16K 15/14; H04L 1/1614; H04L 5/0048; H04W 84/12; F22B 1/284
  USPC .................... 392/200–600; 131/328, 329
  See application file for complete search history.

(56) References Cited

U.S. PATENT DOCUMENTS

2006/0191594 A1 * 8/2006 Py .............................. A61J 1/18
                                                           141/329
2013/0192618 A1 * 8/2013 Li ........................ A24F 47/008
                                                           131/329

(Continued)

FOREIGN PATENT DOCUMENTS

CN     104509986    4/2015
CN     105249536    1/2016

(Continued)

OTHER PUBLICATIONS

International Search Report issued for PCT/CN2016/087301, dated Oct. 26, 2016, 6 pages.

*Primary Examiner* — Tu B Hoang
*Assistant Examiner* — Vy T Nguyen
(74) *Attorney, Agent, or Firm* — Hamre, Schumann, Mueller & Larson, P.C.

(57) ABSTRACT

An integrated liquid injection evaporation container that includes a container body provided with a space for storing a liquid, a seal gasket configured to seal the container body from an upper end portion is provided on an upper portion of the container body, a press cap configured to press the seal gasket tight on the container body. A first injection hole configured to inject a fluid is provided on an upper end of the container body, and a second injection hole corresponding to the first injection hole is provided on the press cap. Use of the first injection hole, the second injection hole, and the seal gasket provides convenient liquid injection without contamination, and simple mechanical liquid injection.

8 Claims, 7 Drawing Sheets

(51) Int. Cl.
   *F22B 1/28*    (2006.01)
   *A24F 47/00*   (2006.01)
   *B65D 41/16*   (2006.01)
   *B65D 53/02*   (2006.01)

(56) References Cited

U.S. PATENT DOCUMENTS

| | | | | |
|---|---|---|---|---|
| 2014/0209108 A1* | 7/2014 | Li | ............ | A24F 47/008 |
| | | | | 131/329 |
| 2015/0144147 A1* | 5/2015 | Li | ............ | A24F 47/008 |
| | | | | 131/329 |
| 2015/0272217 A1* | 10/2015 | Chen | ............ | A24F 47/008 |
| | | | | 131/329 |
| 2016/0128385 A1* | 5/2016 | Lin | ............ | A24F 47/002 |
| | | | | 131/328 |
| 2016/0286860 A1* | 10/2016 | Flayler | ............ | A24F 47/008 |
| 2017/0001854 A1* | 1/2017 | Li | ............ | B65D 47/265 |
| 2017/0006922 A1* | 1/2017 | Wang | ............ | H05B 3/04 |
| 2017/0065001 A1* | 3/2017 | Li | ............ | F16K 15/14 |
| 2017/0181476 A1* | 6/2017 | Li | ............ | A24F 47/008 |
| 2017/0202268 A1* | 7/2017 | Li | ............ | A24F 7/02 |
| 2017/0233114 A1* | 8/2017 | Christensen | ............ | B65B 3/003 |
| | | | | 141/2 |
| 2018/0035718 A1* | 2/2018 | Liu | ............ | A24F 47/00 |

FOREIGN PATENT DOCUMENTS

| | | | | |
|---|---|---|---|---|
| CN | 204994614 | | 1/2016 | |
| CN | 103750570 | | 2/2016 | |
| CN | 205196999 U | * | 5/2016 | ............ F16K 15/14 |

\* cited by examiner

INTEGRATED LIQUID INJECTION EVAPORATION CONTAINER

BACKGROUND

Technical Field

The present disclosure belongs to the field of fluid atomizing devices, and in particular, relates to an integrated liquid injection evaporation container.

Related Art

Currently, there are several liquid injection manners for evaporation containers in the market; (1) screwing off an entire liquid storage device for liquid injection; and (2) screwing off a movable cover for liquid injection. In the prior art, if liquid injection needs to be performed, a liquid storage device or a movable cover usually needs to be screwed off, which is complicated, and when an oil storage device is screwed off, contamination easily occurs; if mechanical liquid injection is used, the device is complex.

SUMMARY

In view of the above, the present disclosure provides an integrated liquid injection evaporation container to resolve the problems of complicated liquid injection, easy contamination, and complex mechanical liquid injection in the prior art.

The present disclosure is implemented in the following way: an integrated liquid injection evaporation container, including a container body provided therein with a space for storing a liquid; a seal gasket configured to seal the container body from an upper end portion is provided on an upper portion of the container body, where the seal gasket is an elastic material; a press cap configured to press the seal gasket tight on the container body is further provided; a first injection hole configured to inject a fluid is provided on an upper end of the container body; a second injection hole corresponding to the first injection hole is provided on the press cap; a heating element configured to evaporate the fluid stored in the container body is provided on a lower end of the container body; a flow-out channel of a fluid evaporation body is provided inside the container body; and the space that stores the fluid is in communication with the flow-out channel via the heating element.

Further, a shape of the container body is cylindrical; the flow-out channel is cylindrical and homocentric to the container body; a press cover provided on an upper portion of the heating element extends into the flow-out channel; and the press cover gets in contact with a lower end of the flow-out channel via a gasket.

Further, at least one first injection hole is provided on the upper end of the container body; the seal gasket is ring-shaped; a protrusion corresponding to the first injection hole is provided on the seal gasket; a lower portion of the protrusion extends into the first injection hole and gets in close contact with the first injection hole; and an upper portion of the protrusion extends into the second injection hole and gets in close contact with the second injection hole.

Further, a step matching the press cap is provided on the upper portion of the container body.

Further, a space for storing a liquid is formed between an inner side of the container body and an outer side of the flow-out channel; and the first injection hole is provided on an upper side of the space.

Further, a through hole matching the flow-out channel is provided on the press cap.

Further, a decorative ring configured to integrally sleeve the heating element and the container body is further provided on an outer side of a lower portion of the container body.

Further, the heating element includes an outer cylinder; a fixing seat is provided in the outer cylinder; a long contact for power conduction is provided on a lower side of the fixing seat; an insulation ring for insulation is provided on an outer ring of the long contact; a steel bushing is provided on an outer ring of the fixing seat; and a lower portion of the press cover extends into the fixing seat.

Further, a washer for sealing is further provided between the press cover and the fixing seat.

Further, there are at least two of the first injection holes, which are symmetrically distributed on an upper side of the container body; and a quantity and a location of the second injection holes correspond to those of the first injection holes.

In the integrated liquid injection evaporation container provided in the present disclosure, use of the first injection hole, the second injection hole, and the seal gasket achieves the objectives of convenient liquid injection without contamination, and simple mechanical liquid injection.

DETAILED DESCRIPTION

Figure 1:
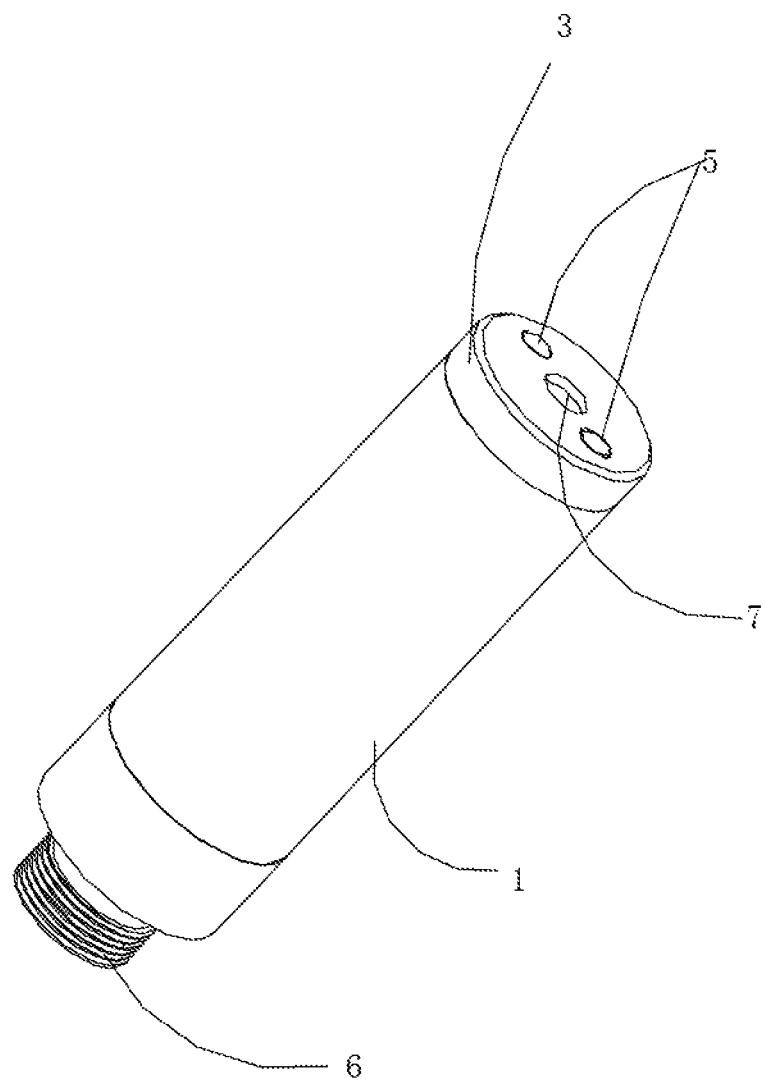
FIG. 1 is a schematic diagram of an integrated liquid injection evaporation container provided by the present disclosure.
Figure 2:
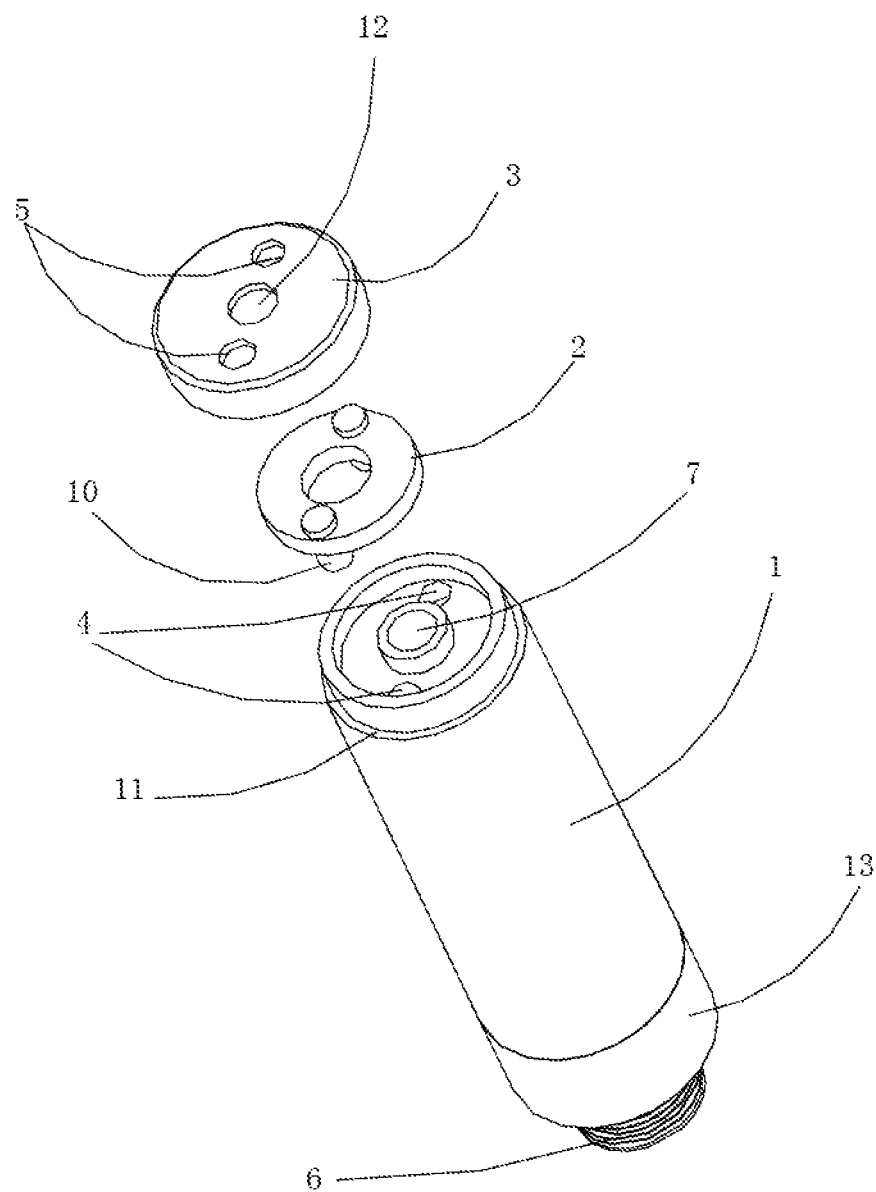
FIG. 2 is a schematic exploded view of a first angle of an integrated liquid injection evaporation container provided by the present disclosure.
Figure 3:
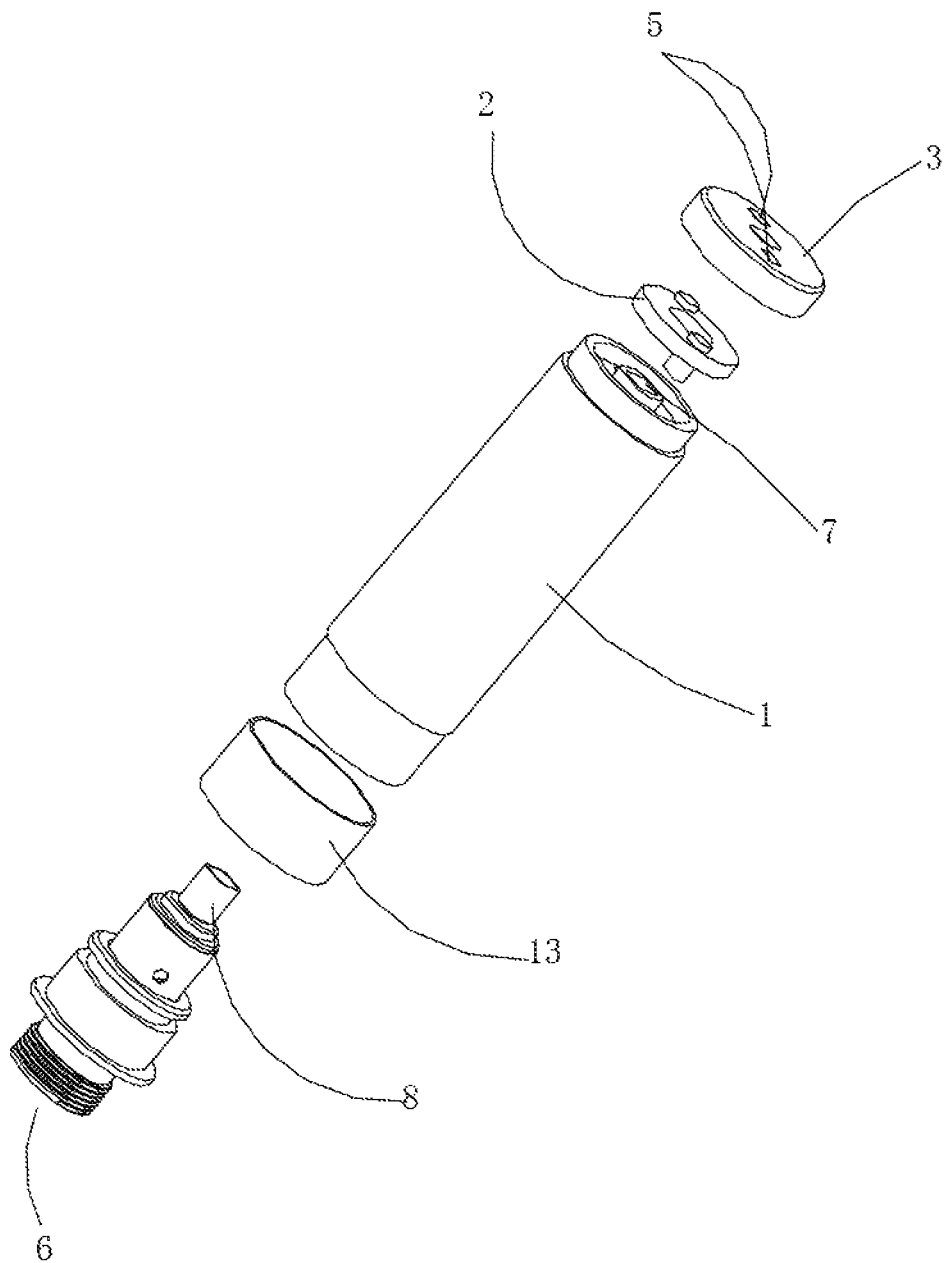
FIG. 3 is a schematic exploded view of a second angle of an integrated liquid injection evaporation container provided by the present disclosure.
Figure 4:
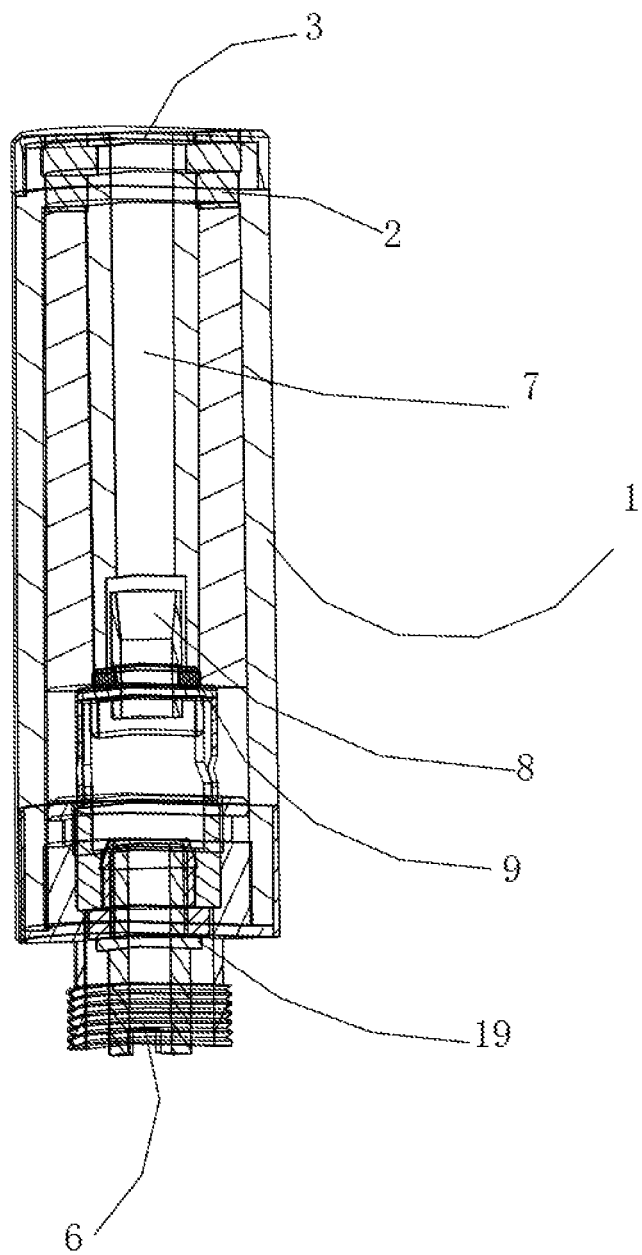
FIG. 4 is a sectional view of an integrated liquid injection evaporation container provided by the present disclosure.
Figure 5:
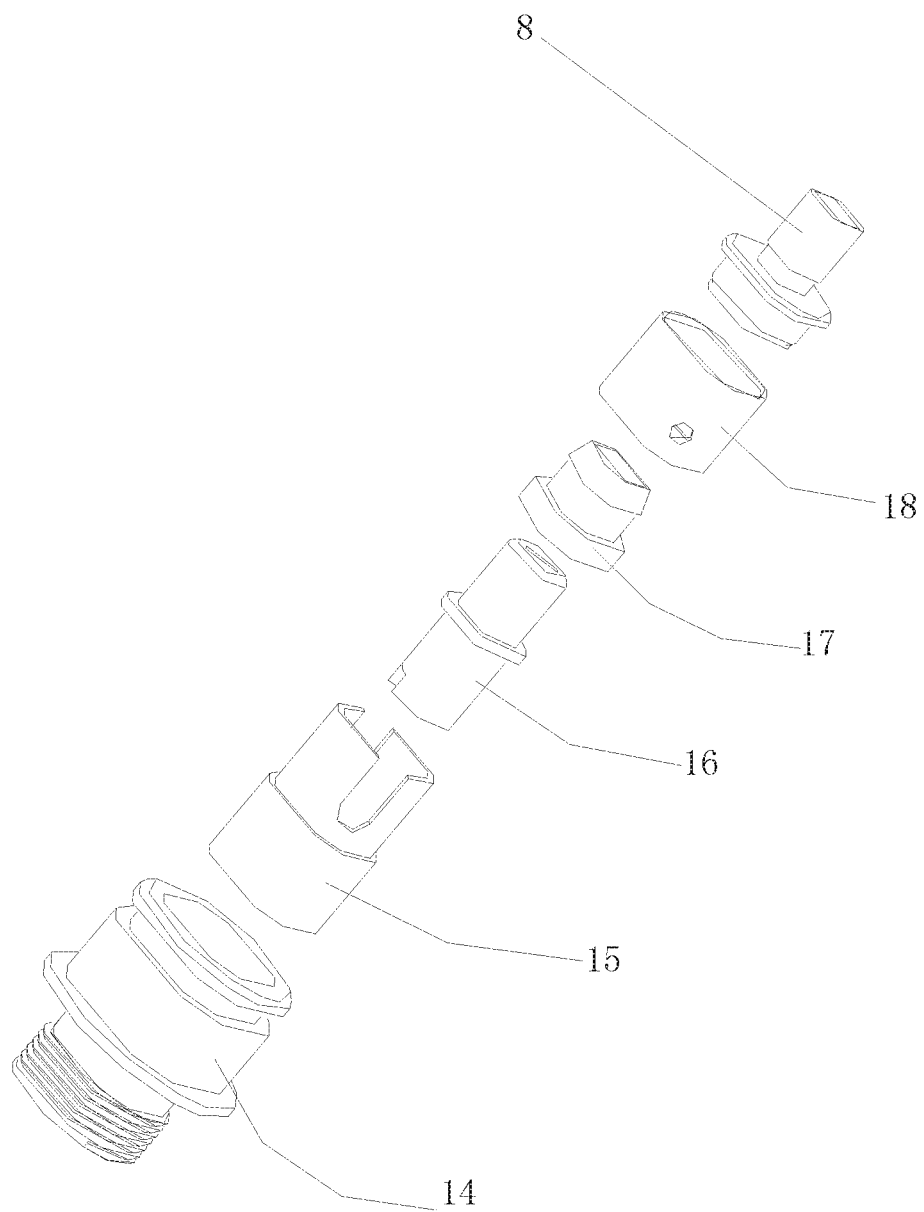
FIG. 5 is a schematic exploded view of a heating element of an integrated liquid injection evaporation container provided by the present disclosure.
Figure 6:
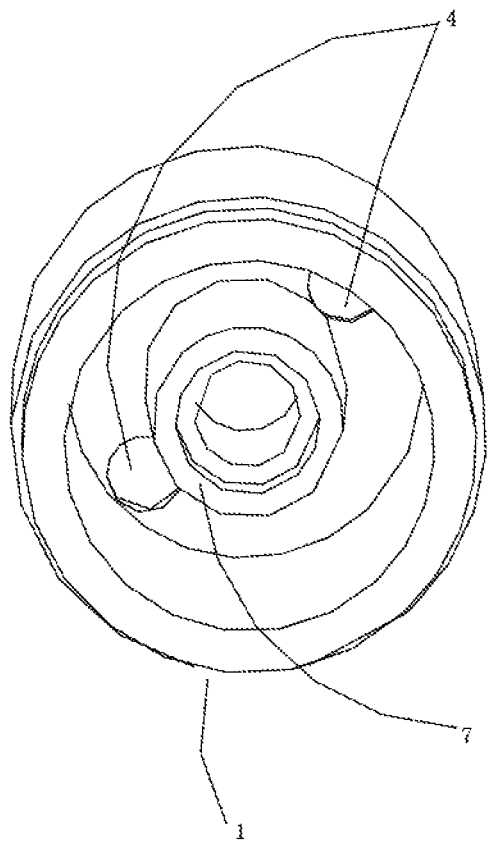
FIG. 6 is a bottom view of a container body of an integrated liquid injection evaporation container provided by the present disclosure.

To make the objective, technical solutions, and advantages of the present disclosure clearer, the present disclosure is further described below in detail with reference to the accompanying drawings and implementation manners. It should be understood that the specific implementation manners described herein are only used to explain the present disclosure, rather than limit the present disclosure.

The present disclosure provides an integrated liquid injection evaporation container, including a container body provided therein with a space for storing a liquid; a seal gasket configured to seal the container body from an upper end portion is provided on an upper portion of the container body, where the seal gasket is an elastic material; a press cap configured to press the seal gasket tight on the container body is further provided; a first injection hole configured to inject a fluid is provided on an upper end of the container body; a second injection hole corresponding to the first injection hole is provided on the press cap; a heating element configured to evaporate the fluid stored in the container body is provided on a lower end of the container body; a flow-out channel of a fluid evaporation body is provided inside the container body; and the space that stores the fluid is in communication with the flow-out channel via the heating element.

Use of the first injection hole, the second injection hole, and the seal gasket achieves the objectives of convenient liquid injection without contamination, and simple mechanical liquid injection.

Implementation of the present disclosure is described below in detail with reference to specific implementation manners.

FIGS. 1, 2, 3, 4, 5, and 6 are schematic diagrams of an integrated liquid injection evaporation container provided by the present disclosure. The integrated liquid injection evaporation container includes a container body 1 provided therein with a space for storing a liquid; a seal gasket 2 configured to seal the container body 1 from an upper end portion is provided on an upper portion of the container body 1; a press cap 3 configured to press the seal gasket 2 tight on the container body 1 is further provided; a first injection hole 4 configured to inject a fluid is provided on an upper end of the container body 1; a second injection hole 5 corresponding to the first injection hole 4 is provided on the press cap 3; a heating element 6 configured to evaporate the fluid stored in the container body 1 is provided on a lower end of the container body 1. In this way, because the seal gasket 2 is used, when the fluid is injected, an injector pierces the seal gasket 2, then performs injection, and is pulled out after completing the injection. In this case, because the seal gasket 2 uses an elastic material, the fluid can be prevented from flowing out of the first injection hole 4, so as to achieve the objective of direct injection without contamination. In actual situations, the seal gasket 2 uses a silicone material, so that leakproofiess when the injector is pulled out as well as service life can be ensured; certainly, other materials may also be used according to actual situations. The evaporation container is placed upside down; then a liquid injection needle is aligned to the second injection hole 5; the liquid injection needle pierces the seal gasket 2 to enter the container body 1, and then injects a liquid; air in the container is extruded during liquid injection, and the air is exhausted by means of the heating element 6 until the container body 1 is filled up with the liquid, and then the liquid injection needle is taken out to complete an oil injection action.

Further, a shape of the container body 1 is cylindrical; a flow-out channel 7 of a fluid evaporation body is provided in the container body 1; the flow-out channel 7 is cylindrical and homocentric to the container body 1; a press cover 8 provided on an upper portion of the heating element 6 extends into the flow-out channel 7; and the press cover 8 gets in contact with a lower end of the flow-out channel 7 via a gasket 9. In this way, it is can be ensured that the flow-out channel 7 is relatively separated from the storage space; the container body 1 may also be made into other shapes, for example, a square, a rhombus, and an oval; extension of the press cover 8 into the flow-out channel 7 can ensure that the fluid flows out of the flow-out channel 7 only after being heated to evaporate by the heating element 6.

Further, at least one first injection hole 4 is provided on the upper end of the container body 1; the seal gasket 2 is ring-shaped; a protrusion 10 corresponding to the first injection hole 4 is provided on the seal gasket 2; a lower portion of the protrusion 10 extends into the first injection hole 4 and gets in close contact with the first injection hole 4; and an upper portion of the protrusion 10 extends into the second injection hole 5 and gets in close contact with the second injection hole 5. Use of a structure of the protrusion 10 not only enhances a strength of a piercing portion, but also ensures effective retraction and reliable sealing of the pierced protrusion 10.

Further, a step 11 matching the press cap 3 is provided on the upper portion of the container body 1, so as to ensure that the press cap 3 is integrally aligned to an outer circle of the container body 1, thereby facilitating assembly.

Further, a space for storing a liquid is formed between an inner side of the container body 1 and an outer side of the flow-out channel 7; and the first injection hole 4 is provided on an upper side of the space, so that it can be ensured that the fluid is not injected into the flow-out channel 7 by mistake, and the fluid is reliably injected into a cavity formed between the inner side of the container body 1 and the outer side of the flow-out channel 7.

Further, a through hole 12 matching the flow-out channel 7 is provided on the press cap 3, so as to ensure use and assembly of an electronic cigarette.

Further, a decorative ring 13 configured to integrally sleeve the heating element 6 and the container body 1 is further provided on an outer side of a lower portion of the container body 1, so that the container body 1 is integrally connected to the heating element 6, thereby facilitating use and assembly.

Further, the heating element 6 includes an outer cylinder 14; a fixing seat 15 is provided in the outer cylinder 14; a long contact 16 for power conduction is provided on a lower side of the fixing seat 15; an insulation ring 17 for insulation is provided on an outer ring of the long contact 16; a steel bushing 18 is provided on an outer ring of the fixing seat 15; and a lower portion of the press cover 8 extends into the fixing seat 15. In this way, the heating assembly 6 can be reliably assembled with the container body 1.

Further, a washer 19 for sealing is further provided between the press cover 8 and the fixing seat 15, so as to ensure sealing.

Further, there are at least two of the first injection holes 4, which are symmetrically distributed on an upper side of the container body 1; and a quantity and a location of the second injection holes 5 correspond to those of the first injection holes 4. A larger quantity of the first injection holes 4 indicates more uniform injection. However, an excessively large quantity of injection holes also causes the problem of troublesome fabrication, and actually it is found that two is best.

Figure 7:
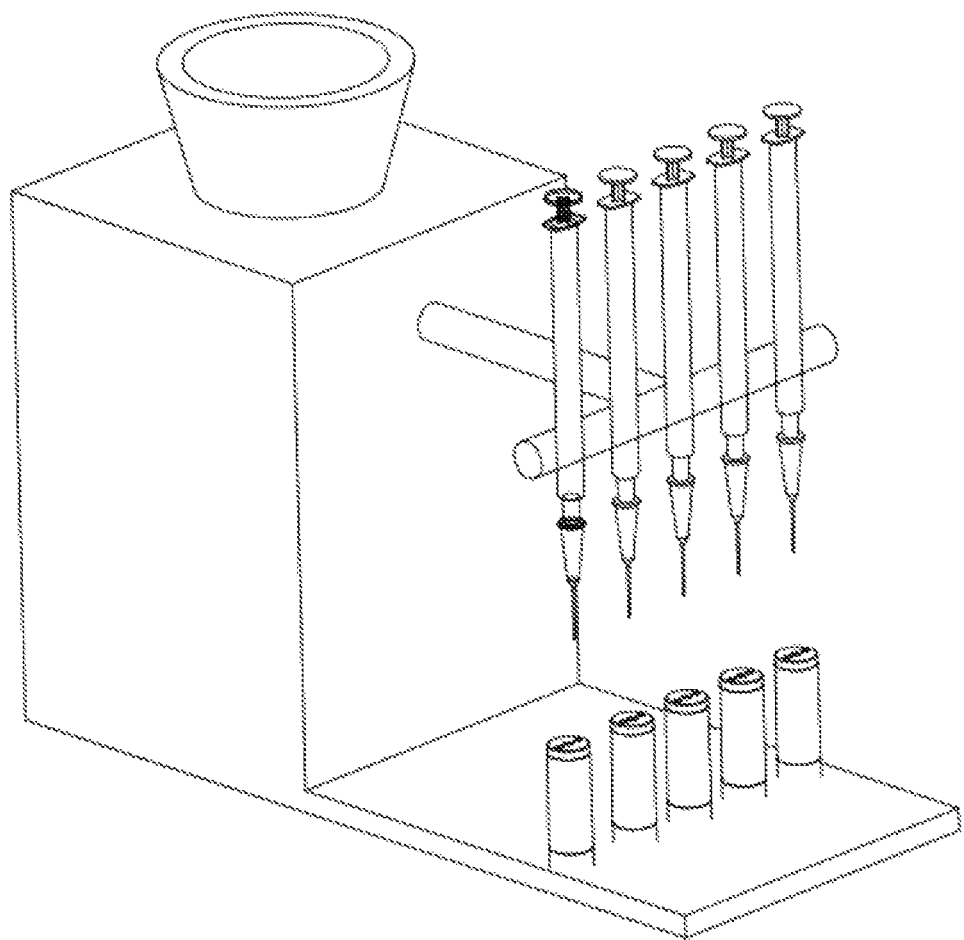
FIG. 7 is a schematic diagram of mechanical injection of an integrated liquid injection evaporation container provided by the present disclosure.

At the same time, as shown in FIG. 7, the evaporator may further implement mechanical liquid injection with a simple and reliable structure.

In conclusion, use of the first injection hole, the second injection hole, and the seal gasket in the present disclosure achieves the objectives of convenient liquid injection without contamination, and simple mechanical liquid injection.

The foregoing descriptions are merely preferred implementation manners of the present disclosure, and are not intended to limit the present disclosure. Any modification, equivalent replacement, or improvement made within the spirit and principle of the present disclosure should fall within the protection scope of the present disclosure.

What is claimed is:
1. An integrated liquid injection evaporation container, comprising:
a container body provided therein with a space for storing a liquid;

a seal gasket configured to seal the container body from an upper end portion is provided on an upper portion of the container body, the seal gasket being an elastic material and ring-shaped;

a press cap configured to press the seal gasket tight on the container body is further provided;

a first injection hole configured to inject a fluid is provided on an upper end of the container body;

a second injection hole corresponding to the first injection hole is provided on the press cap;

a heating element configured to evaporate the fluid stored in the container body is provided on a lower end of the container body; and a flow-out channel of a fluid evaporation body is provided inside the container body; and the space that stores the fluid is in communication with the flow-out channel via the heating element, wherein a through hole matching the flow-out channel is provided on the press cap;

a protrusion corresponding to the first injection hole is provided on the seal gasket, a lower portion of the protrusion extending into the first injection hole and gets in close contact with the first injection hole, and an upper portion of the protrusion extends into the second injection hole and gets in close contact with the second injection hole, the press cap and the upper portion of the protrusion are configured so that the upper portion is outwardly exposed through the second injection hole so as to allow an injector to pierce through the protrusion to inject the fluid, and the seal gasket is configured so that after the injector is pulled out of the projection of the seal gasket, the fluid is prevented from flowing out of the first injection hole due to the elastic material of the seal gasket.

2. The integrated liquid injection evaporation container according to claim 1, wherein a shape of the container body is cylindrical; the flow-out channel is cylindrical and homocentric to the container body; a press cover provided on an upper portion of the heating element extends into the flow-out channel; and the press cover gets in contact with a lower end of the flow-out channel via a gasket.

3. The integrated liquid injection evaporation container according to claim 2, wherein a step matching the press cap is provided on the upper portion of the container body.

4. The integrated liquid injection evaporation container according to claim 3, wherein a space for storing a liquid is formed between an inner side of the container body and an outer side of the flow-out channel; and the first injection hole is provided on an upper side of the space.

5. The integrated liquid injection evaporation container according to claim 1, wherein a decorative ring configured to integrally sleeve the heating element and the container body is further provided on an outer side of a lower portion of the container body.

6. The integrated liquid injection evaporation container according to claim 5, wherein the heating element comprises an outer cylinder; a fixing seat is provided in the outer cylinder; a long contact for power conduction is provided on a lower side of the fixing seat; an insulation ring for insulation is provided on an outer ring of the long contact; a steel bushing is provided on an outer ring of the fixing seat; and a lower portion of the press cover extends into the fixing seat.

7. The integrated liquid injection evaporation container according to claim 6, wherein a washer for sealing is further provided between the press cover and the fixing seat.

8. The integrated liquid injection evaporation container according to claim 7, wherein there are at least two of the first injection holes, which are symmetrically distributed on an upper side of the container body; and a quantity and a location of the second injection holes correspond to those of the first injection holes.

\* \* \* \* \*